United States Patent [19]

Shay

[11] 3,912,484

[45] Oct. 14, 1975

[54] METHOD OF GLASS DELIVERY FOR PRESS-FORMING

[75] Inventor: George C. Shay, Corning, N.Y.

[73] Assignee: Corning Glass Works, Corning, N.Y.

[22] Filed: Sept. 23, 1974

[21] Appl. No.: 508,261

[52] U.S. Cl. .......................... 65/70; 65/71; 65/72; 65/123
[51] Int. Cl.² ......................................... C03B 7/00
[58] Field of Search ............ 65/123, 68, 70, 71, 72, 65/207

[56] References Cited
UNITED STATES PATENTS

| | | | |
|---|---|---|---|
| 1,323,507 | 12/1919 | Wadsworth | 65/207 X |
| 3,245,770 | 4/1966 | Cortright et al. | 65/71 |
| 3,839,003 | 10/1974 | Dockerty et al. | 65/71 |

*Primary Examiner*—Arthur D. Kellogg
*Attorney, Agent, or Firm*—Burton R. Turner; Clarence R. Patty, Jr.

[57] ABSTRACT

In the press-forming of hollow articles from molten glass, a stream of molten glass is fed vertically downwardly from a delivery orifice a distance of at least about five feet into a bottom portion of a mold rotating about a vertical axis, with said stream impinging upon the bottom portion of the mold at a position slightly offset from said vertical axis of rotation, to form a substantially blister and bubble free charge therein. In its downward travel from the delivery orifice, the stream of substantially uniform diameter, passes through an initial stable delivery zone, an unstable delivery zone, and finally into a second stable delivery zone, wherein mold impingement of the stream is obtained.

5 Claims, 1 Drawing Figure

U.S. Patent  Oct. 14, 1975  3,912,484
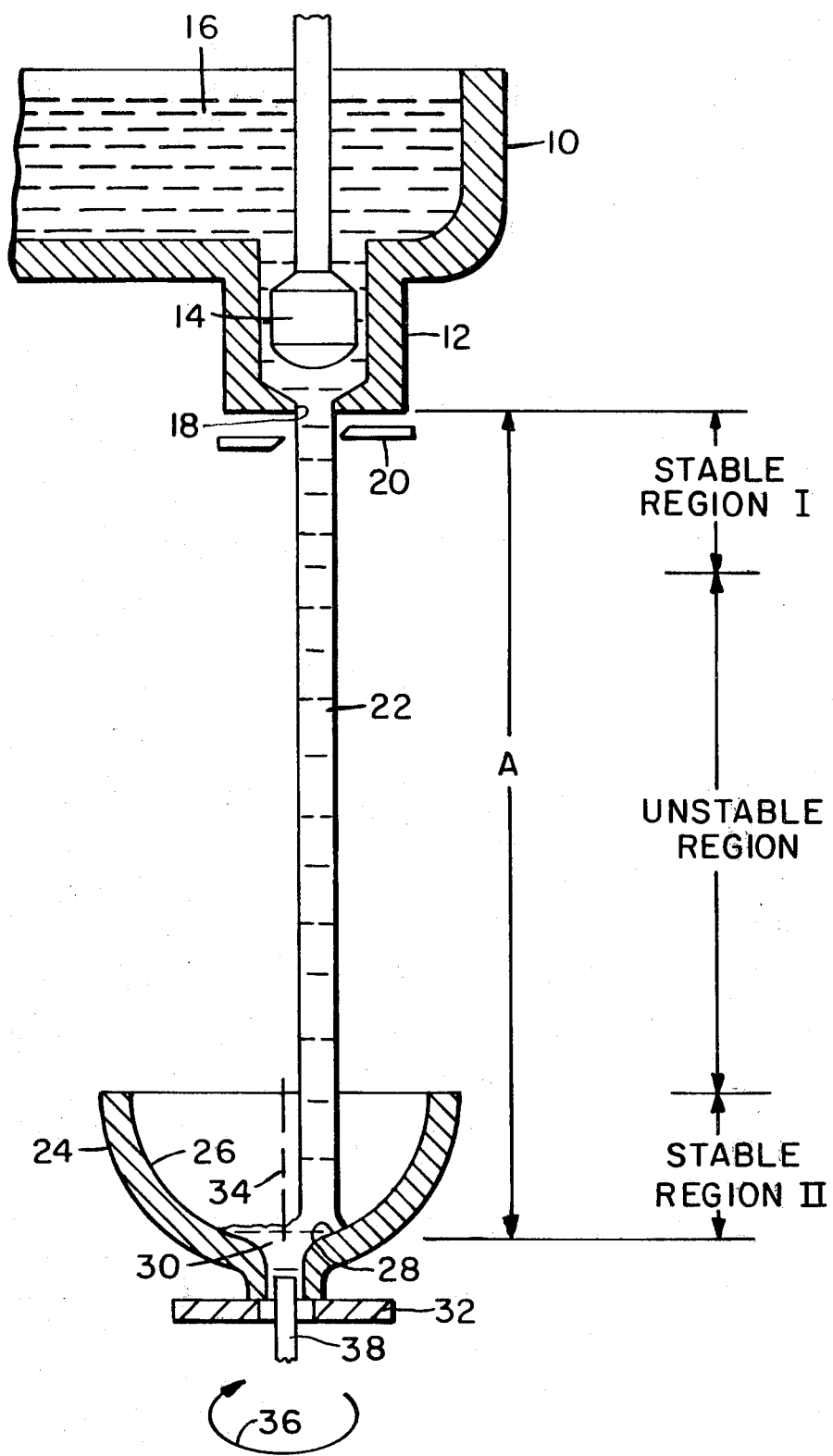

METHOD OF GLASS DELIVERY FOR PRESS-FORMING

BACKGROUND OF THE INVENTION

The present invention pertains to the optimization of feeding molten glass to pressing molds for forming hollow glass articles having at a substantial depth, so as to maximize production rates by minimizing pressing forces as well as dwell and cooling periods.

In the past it has been customary to deliver a glass charge to a press-forming mold by causing a highly viscous glass to ooze from an orifice and form a tear drop shaped gob which is suspended from the orifice. The gob is then severed from the orifice by means of shears and allowed to drop into the mold as a discrete glob of material, whereupon the mold is transported under a plunger or ram and an article pressed therebetween. The shape of the gob may be varied for different articles by varying the speed of a vertically movable needle or plunger positioned within the feeder, which functions to open and close the orifice. In addition the gob shape may be varied by changing the viscosity of the glass within the feeder by controlling the temperature of the glass, since glass temperature and viscosity are inversely proportional. A highly viscous glass will tend to provide a short thick gob, whereas low viscosity glasses produce long and thin gobs. However, the gobbing range is rather restricted in practice to between about 2000 poises and 5000 poises.

In view of the fact that the force required to press molten glass into a finished article is directly proportional to the viscosity of the glass presented to the mold and plunger combination, the use of lower viscosity glasses for pressing therefore becomes a desirable objective. However, since gob charging is limited at its lower viscosity to about 2000 poises, it becomes necessary to utilize stream feeding when employing glasses having low viscosities below about 2000 poises. Further, when pressing hollow articles having a substantial depth and a lower neck portion, such as TV funnels, it has been found that low pressing forces are beneficial in avoiding glass checks or cracks in the delicate neck area. Offsetting the advantages of low viscosity glass, however, is the fact that the temperature of the delivered glass must be increased to decrease viscosity, and accordingly production rates have a tendency to be decreased since more time is required in the dwell and/or cooling periods in order to remove the additional heat from the glass.

SUMMARY OF THE INVENTION

The present invention relates to the delivery of a charge of molten glass to a pressing mold for press-forming hollow articles having a fairly deep cavity, wherein the molten charge is of a relatively low viscosity so as to reduce the necessary pressing forces, and yet is delivered to the mold in a manner to avoid the entrapment of seeds and blisters.

In its simplest form, the present invention includes the delivery of a substantially uniform stream of molten glass to a bottom portion of a mold rotating about a vertical axis such that said stream impinges upon such bottom portion at a position slightly offset from said vertical axis so as to produce a pool of molten glass in the bottom of said mold. Further, the stream is delivered downwardly from the discharge orifice of the glass feeder a distance of at least about 5 feet before impinging upon the bottom portion of said mold so that the stream initially passes through a stable region, wherein were mold impingement to take place within such region the stream would be delivered thereto in a uniform steady condition, and then the stream passes through an unstable region, wherein were mold impingements to take place the stream would be unsteady or erratic and wobble or wriggle as it impinged upon the mold thus entrapping seed and blisters, and finally the stream passes into a second stable region wherein mold impingement actually takes place with a steady uniform stream which together with the mold rotation produces a substantially seed and blister free charge to the mold.

The stream delivered to the mold is distinguished from a conventional discrete gob in that the leading end of the stream contacts the bottom of the mold before the trailing end is cut by the shears at the orifice. In a gobbing operation, a charge of molten glass is first suspended from the orifice and then sheared so as to fall into the mold as one discrete glob. A further distinction is the fact that a stream charge has a relatively constant diameter throughout its length from the orifice to the mold with only minor variations at the beginning and end where the stream is sheared. Finally, it is usually accepted to define a stream as a molten charge having a length to diameter ratio of over 10:1.

It has thus been an object of the present invention to provide an inproved process for delivering a charge of molten glass to a pressing mold in such a manner so that a fairly broad range of viscosities may be utilized to obtain the manufacture of the maximum number of good ware pieces per hour, wherein such number is a product of the possible production rate and the percent selection.

BRIEF DESCRIPTION OF THE DRAWING

The FIGURE is a somewhat schemmatic sectional view in elevation illustrating the position of the pressing mold relative to the discharge orifice of the glass feeder such that the axis of rotation of the mold and the vertical axis of the stream are parallel and only slightly offset one from another.

DESCRIPTION OF THE PREFERRED EMBODIMENTS

Referring now to the drawing, a glass feeder 10 is shown having a well 12 provided with a control needle 14 for controlling the flow of molten glass 16 through a discharge orifice 18. A pair of shears 20 are shown positioned beneath the orifice 18 for cutting a stream 22 of molten glass being delivered to a rotating mold 24 positioned therebelow.

The mold 24 is shown having a central cavity 26 provided with a bottom portion 28 upon which the stream 22 impinges so as to provide a pool of molten glass 30 therewithin. The mold 24, mounted upon a suitable support 32, is rotatable about a vertical axis 34 as shown by arrow 36, which axis is parallel to and slightly offset from the axis of orifice 18 and stream 22. A suitable knockout plunger 38 is shown projecting up through an opening in support 32.

The distance A between the discharge orifice 18 and the area of impingement upon the bottom portion 28 of mold 24 is preferably greater than five feet in length, and includes a first stable region, an unstable region, and a second stable region. It is known that a low viscosity stream can be delivered successfully to a press mold if the mold is held close to the orifice so as to be positioned within stable region I. Such a region would normally be within 12 inches of the discharge orifice 18.

However, as the viscosity of the glass is increased sufficiently, this critical dimension must be diminished in order to avoid the tendency of the stream to begin wobbling or wriggling as it is delivered, which entraps seeds or blisters in the deposited charge. In the case of TV funnel molds such as 24 having rather deep cavities 26, mechanical restrictions virtually prohibit the obtainment of a stream distance small enough to permit a desired range of delivery viscosities. By offsetting the mold from the center of the stream and rotating such mold about a vertical axis while the stream is being delivered thereto, it is possible to reduce the deleterious air entrapment effect of an unsteady stream and allows greater variation in glass viscosity. However, between a distance of about 1 foot to about 5 feet below the orifice 18, the stream becomes so unstable and erratic that air entrapment cannot be avoided even with mold rotation.

By increasing distance A beyond five feet below the discharge orifice, I have found that a second stable region is encountered which together with offset loading and rotation of the mold provides for the delivery of a uniform steady stream over a variety of viscosity ranges without the formation of detrimental seeds or blisters within the charge deposited in the bottom of the mold. In fact, I have found that the second stable region, beginning about 5 feet below the orifice is effective for viscosities ranging between about 100 poises and 1500 poises, with the range of viscosities or stable loadings being enhanced by the rotation of the mold about axis 34 offset from the axis of the stream.

Thus, particularly when press-forming deep articles from molten glass, such as TV funnels wherein mold distances must be at least about 10 inches to provide mechanical clearance, and wherein it is virtually impossible to position such molds within stable region I, the utilization of stable region II together with mold rotation provides for the delivery of a substantially seed and blister free charge to the mold while also providing for a wide viscosity range of delivery so as to optimize manufacturing capabilities.

Although by no means limiting in nature, the following specific example is given as an illustration of a preferred embodiment of the present invention. Molten glass at a viscosity of about 800 poises was delivered as a uniform stream from a discharge orifice having a diameter of about two inches to the bottom of a rotating mold positioned 70 inches below said discharge orifice. The mold was rotated at a speed of approximately 60 rpm about a vertical axis offset 2 inches from the axis of the delivery stream. The upper part of the stream was cut approximately 2 seconds after the lower end of the stream initially contacted the mold so as to produce a substantially seed and blister free 8½ pound charge in the bottom of the rotating mold.

It thus can be seen from the foregoing example that the stream feeding of the present invention materially differs from the conventional gob feeding of the prior art. In fact where a stream may be considered to have a length to diameter ratio of over 10:1, the stream of the present invention with a two inch orifice and a minimum 5 foot delivery heighth would have a length to diameter ratio of 30:1. However, it will be apparent that different orifice diameters and the particular distance A utilized will produce a variety of length to diameter ratios.

Although I have disclosed the now preferred embodiments of my invention, it will be apparent to those skilled in the art that various changes and modifications may be made thereto without departing from the spirit and scope thereof as defined in the appended claims.

I claim:

1. A method of delivering a substantially blister and seed free uniform charge of molten glass from a discharge orifice to a forming mold which comprises, positioning a mold having a mold cavity below a discharge orifice such that a bottom portion of said mold cavity is at least about five feet below said discharge orifice, rotating said mold about a vertical axis, supplying a uniform stream of molten glass from said discharge orifice to said rotating mold, impinging said stream on said bottom portion at a position adjacent to but slightly offset from said vertical axis, and forming a pool of substantially seed and blister free glass in the bottom of said mold cavity.

2. A method of delivering a substantially blister and seed-free uniform charge of molten glass as defined in claim 1 including the step of cutting said stream of molten glass adjacent said orifice after said stream has initially impinged upon said bottom portion.

3. A method of delivering a charge of molten glass from a discharge orifice to a forming mold positioned therebelow which comprises, positioning a mold having a central axis below said discharge orifice such that the central axis of said mold is offset with respect to a central axis through said discharge orifice, delivering a stream of molten glass from said discharge orifice through a first stable region, then an unstable region, and finally into a second stable region; impinging said stream on said mold within said second stable region and at a position offset from but adjacent to the central axis of said mold; forming a substantially blister and seed free pool of molten glass in the bottom of said mold; and cutting said stream adjacent said orifice.

4. A method of delivering molten glass as defined in claim 3 wherein the impingement of said stream upon said mold within said second stable region is at least about five feet below said discharge orifice.

5. A method of delivering molten glass as defined in claim 3 wherein said mold is rotated about its central axis, and said stream is impinged upon said rotating mold.

* * * * *